US012682343B2

(12) United States Patent
Benvenuti et al.

(10) Patent No.: US 12,682,343 B2
(45) Date of Patent: Jul. 14, 2026

(54) SELF-SOVEREIGN-IDENTITIES (SSI) FOR IoT AND NEXT INTERNET

(71) Applicants: 3D-OXIDES SAS, Saint-Genis-Pouilly (FR); ABCD TECHNOLOGY SARL, Nyon (CH)

(72) Inventors: Giacomo Benvenuti, Ferney Voltaire (FR); Sarunas Bagdzevicius, Cessy (FR); Benjamin Malthiery, Les Fleurs du Jura (FR)

(73) Assignees: BONOXIDES SAS, Saint-genis-Pouilly (FR); ABCD TECHNOLOGY SARL, Nyon (CH)

( * ) Notice: Subject to any disclaimer, the term of this patent is extended or adjusted under 35 U.S.C. 154(b) by 121 days.

(21) Appl. No.: 18/566,699

(22) PCT Filed: Jun. 6, 2022

(86) PCT No.: PCT/EP2022/065295
§ 371 (c)(1),
(2) Date: Dec. 4, 2023

(87) PCT Pub. No.: WO2022/263216
PCT Pub. Date: Dec. 22, 2022

(65) Prior Publication Data
US 2024/0370861 A1 Nov. 7, 2024

(30) Foreign Application Priority Data
Jun. 15, 2021 (FR) ....................................... 2106299

(51) Int. Cl.
*G06Q 20/38* (2012.01)
*G06Q 20/40* (2012.01)

(52) U.S. Cl.
CPC ....... *G06Q 20/3829* (2013.01); *G06Q 20/401* (2013.01)

(58) Field of Classification Search
None
See application file for complete search history.

(56) References Cited

U.S. PATENT DOCUMENTS

2017/0230375 A1 8/2017 Kurian
2021/0160261 A1* 5/2021 Kwatra .................. H04L 63/20
(Continued)

FOREIGN PATENT DOCUMENTS

WO 2015/140731 A1 9/2015
WO 2020/099629 A1 5/2020

OTHER PUBLICATIONS

International Search Report (ISR), International Application No. PCT/EP2022/065295, mailed Aug. 12, 2022, 4 pages.
(Continued)

*Primary Examiner* — Jamie R Kucab
(74) *Attorney, Agent, or Firm* — Francis J. Maguire; WARE FRESSOLA MAGUIRE & BARBER LLP

(57) ABSTRACT

A computer-implemented system is shown for secure transactions between users, based on a network of blockchains, and a computer-implemented method employing such a computer-implemented system, wherein the architecture of the network of blockchains is defined by rules of smart contracts defined by users at each transaction, allowing extreme agility in governance, sovereignty and interoperability and allowing the optimization of information exchange/validation both in speed and consumed resources. The computer-implemented system further enables Trust implementation to achieve self-sovereign identities for objects to remove or reduce human intermediation in data management and organization.

14 Claims, 6 Drawing Sheets

(56) References Cited

U.S. PATENT DOCUMENTS

| | | | | |
|---|---|---|---|---|
| 2022/0006658 | A1* | 1/2022 | Benvenuti | H04L 9/3278 |
| 2022/0174059 | A1* | 6/2022 | Fields | H04L 9/3239 |
| 2022/0286275 | A1* | 9/2022 | Davis | H04L 9/0643 |
| 2024/0078551 | A1* | 3/2024 | Liu | G06Q 20/02 |

OTHER PUBLICATIONS

Written Opinion of the International Searching Authority (ISA/EP), International Application No. PCT/ EP2022/065295, mailed Aug. 12, 2022, 6 pages.

Sidra Malik et al., "TrustChain: Trust Management in Blockchain and IoT supported Supply Chains," 2019 IEEE International Conference on Blockchain, IEEE, Jul. 14, 2019, pp. 184-193, 10 pages.

Rameez Asif et al., "Proof-of-PUF Enabled Blockchain: Concurrent Data and Device Security for Internet-of-Energy," Sensors 2021, vol. 21, No. 1, Dec. 23, 2020, pp. 1-32, 32 pages.

* cited by examiner

SELF-SOVEREIGN-IDENTITIES (SSI) FOR IoT AND NEXT INTERNET

BACKGROUND OF THE INVENTION

Common world trade is based on physical interactions between a vendor and a buyer. In the digital world, digital trade of goods (such as money in the bank digital accounts) is based instead on information that is stored as digits, therefore goods are represented by numbers inside a computer device. Digital goods (including digital representation of physical goods, such as the numbers in accounting list inside databases, digital images, digital games, etc.) could in principle be copied (multiplied) without spending resources to physically recreate them (double-spending problem). To assure and keep intrinsic value of digital goods a third-party supervisor is needed, to certify that indeed a good or an asset/value was actually transferred, e.g., from vendor to buyer. The trade system has thus shifted to a system based on trust: both vendor and buyer need to trust the certifying supervisor (the intermediary).

Accordingly, transactions that imply transfer of information, either physical or digital and optionally including information on identity of users, are based on trust between the involved users.

Today, distributed ledger databases based on the blockchain or DLT (Distributed Ledger Technologies) protocols (hereinafter simply called "blockchains", for conciseness) are employed for secure transactions between two or more parties (for instance between a vendor and a buyer, between a citizen and a governmental office or a bank, etc.) and to immutably track exchanges between users. The first aim of blockchains was to replace entities used to certify transactions (intermediaries) with a distributed trust model not relying on a centralized and accredited platform. In other words, blockchains are aimed at achieving Trust without a supervisor, as the value (digital) transfer system is no more controlled by one certifying entity, but it follows the strict mathematical (cryptographic) and economical rules set of the protocol.

Therefore, Trustfulness of the system depends on the rules set.

One of the most difficult parts when making digital value transfer systems is then how to choose the mathematical rules to be efficient, enforceable and usable, with agility to evolve without abusing the system.

First generation blockchains, like Bitcoin and Ethereum, have rules based on the consensus mechanisms called proof-of-work (PoW), that relies on mathematical functions which are difficult to calculate, but easy to check (so called hash functions) for current state of the art computers and economic rules set to prohibit malicious collusions. The PoW consensus mechanisms depend on the computational power possessed by each network participant (or colluding group of participants) to make calculations which secure the network. As these blockchains became more popular, it became profitable to make these mathematical computations as a business, leading to unsustainable energy expenditures as the cheapest energy is found in the most vulnerable and least regulated countries. Mathematical algorithms and the socio-economical model chosen set a limit to total possible transactions per second (TPS) inside the network and make however the system not scalable. Moreover, mathematical rules set at the beginning cannot be changed easily and need active participation of a major part of the network users, what is hard to achieve in an open environment. The blockchains cannot thus easily adapt to the needs of a fast-growing system or of a complex system where all governance rules and stakeholders cannot be easily anticipated since the beginning.

Second generation blockchains, like Ripple or EOS, chose more energy efficient rules, relying on a Proof-of-Stake (POS) consensus mechanism based on value of each participant inside the system. This increased the TPS limit, however, these second-generation systems are still very energy demanding, and still have the above-mentioned limits about governance rules and stakeholders.

Furthermore, PoW, PoS and other consensus mechanisms are not scalable to the Internet-of-Things (IoT) scale or to the new web models (Web3), with billions of communicating computing devices making several TPS each and current socioeconomical rules of the blockchains do not have equivalent ones for the IoT framework. Both energy efficiency and transaction speed need thus to be increased by orders of magnitude in the IoT or Web3 frameworks.

Moreover, security of the blockchains is still an issue since blockchains are as secure as the authentication method used: cryptographic keys (certificates) used need to be properly governed and secured by the person managing them or if dedicated, by the centralized systems (platforms). Making strong efforts to decentralize the ledger loses its intrinsic purpose if a central platform (with the possibility to make backdoors managed by a central authority) is then put into place. Security governance is hence also a problem. Furthermore, the effort to provide sound security is not trivial as most transactions require time consuming procedures to avoid unauthorized tampering. This is a main bottleneck for scaling to systems such as IoT where speed is foreseen as a must-have asset.

Also, nowadays, new methods of verifying users' identity are needed, overcoming the well-known limits of the authentication systems based on usernames and passwords.

This is again getting more important in the IoT, where physical objects shall have a verifiable identity. In the near future in fact smarter objects will be able to address more tasks (leading to higher granulometry and quantitative approaches in information management), possibly without human intermediation or supervision, gaining full autonomy. Secure identities will be a must have in any security protocols.

For people, authentication protocols are generally based on biometric features (face morphology, fingerprints, voice recognition, etc.) and on intangible track records (e-mails, bank accounts, tax number, etc, for private individuals, as well as financial sheets, sales records, etc, for companies and governments). For objects these authentication means are still in their infancy. As for human-beings, identities based on simple authentication are not sufficient anymore. Traceability features, such as location tracking of the connection, have been introduced in the last years, but will still not be sufficient in the future. The identities of users should also be based on their interactions' history. Today no solutions are available for objects in this direction.

So far physical identities are well controlled by more or less trustful governments, but people's number of "fingerprints", digital accounts for digital identities authentication, are exploding, with a huge increase of the number of platforms providing fingerprints and with absolutely no data owner control over trust and security. This further introduces a main challenge with regards to interoperability as the platforms are very opaque on what they do with the collected information that represents a "footprint" of each user's activity. Footprint is definitely part of a user's identity. Furthermore, it is of paramount importance that physical and digital identities are merged into a single standard to achieve a trustful bijective relation between the physical and digital worlds.

Self-Sovereign identities (SSI) were recently introduced through blockchains to provide identities to persons not based on any specific platform, in order to avoid loss of sovereignty and governance by individuals of their identities by supporting user-centric management capacity. If the concept of SSI for people is however still very complex to develop, today such a model is not available for objects managing low-cost data (IoT).

SUMMARY OF THE INVENTION

The present invention is directed to a computer-implemented system for providing self-sovereign identities to users of a network, said users being human beings, objects or other entities. The computer-implemented system of the invention comprises an authentication device associated to each user for authentication of the digital identity of said user, a footprint for securely tracking information exchanged between users within a holistic organization of information, through semantic blockchains, and a Trust Function for establishing the level of Trust of a given user identity. The present invention is further directed to networks and methods employing said system, for providing self-sovereign identities to users and for carrying out secure transactions between users.

Providing SSI to objects requires in fact a user-centric management of identity by the object itself, both at fingerprint and footprint level. Today no technologies and models are secure and trustful enough to be of any use to achieve this goal. The present invention aims at solving the above problems, by providing a system to provide SSI to users of a network, said users being either human beings or objects or entities. The SSI provided by the system of the invention does not need to be controlled by any authority and as such cannot be modified, withdrawn, abused or denied arbitrarily by such an authority. Furthermore, the present invention provides methods for secured transactions, such as transfer of goods, which are faster, more energy efficient and which are also more secure, wherein security depends on Trust of the network and of its users, including identification of said users.

According to a first aspect of the present invention, a computer-implemented system for transactions between users of a network, comprises:

- a network comprising a plurality of blockchains, each comprising at least one block linked by a cryptographic key to other blocks of the same and/or different blockchains,
- a plurality of users accessing the network, preferably wherein at least one of the users is an object,
- at least one transaction between two or more users of the network, comprising at least one Smart Contract, wherein the system is characterized in that said Smart Contract comprises rules determining that new blocks are added to the at least one of the blockchains of the network upon execution of the Smart Contract In further accord with the first aspect of the present invention, the plurality of blockchains may comprise:

- private blockchains, wherein each user owns at least one of said private blockchains and
- public blockchains, wherein each user owns or is associated to at least one of said public blockchains;

wherein the Smart Contract comprises rules determining that upon execution of the Smart Contract new blocks are added to at least one of the private blockchains and to at least one of the public blockchains of each user involved in the transaction, wherein the new blocks are linked by a cryptographic key, preferably wherein the new blocks are also semantically linked.

In still further accord with the first aspect of the present invention, the computer-implemented system may further comprise:

- at least one digital identity associated to each user, for authenticating said user, preferably said digital identity comprising a physical fingerprint;
- at least one footprint blockchain for tracking all the transactions involving each user, said at least one footprint comprising blocks of private blockchain(s) owned by said user and optionally blocks of public blockchain(s) linked to at least one private blockchain owned by said user;
- at least one Trust Function blockchain associated to each user, being a public blockchain that records a set of parameters that define said user's trust, preferably on the basis of an algorithm whose rules are defined in the Smart Contract;
- wherein the Smart Contract comprises rules determining that upon execution of the Smart Contract new blocks are added to at least one footprint blockchain and to at least one trust function blockchain of each user involved in the transaction.

In the computer-implemented system the parameters that define a user's trust may be used as a Proof-of-Stakes Indicator in a blockchain protocol.

In the computer-implemented system the fingerprint associated to each user may comprise at least one Physical Unclonable Function or a secure element.

The computer-implemented system may further comprise at least one digital repository, wherein the digital information, or a part of the digital information, of the transaction is stored.

In the computer-implemented system, the new blocks added upon execution of the Smart Contract may comprise a hyperlink towards one or more repositories where digital information of the transaction is stored.

In the computer-implemented system, the plurality of private blockchains may comprise or consist of a plurality of sidechains, preferably wherein at least two sidechains are semantically linked.

In the computer-implemented system, the smart-contract may comprise a plurality of independent rules-blocks, organized according to users' negotiation.

In the computer-implemented system, the rules-blocks may comprise links to a plurality of blockchains and/or to a plurality of digital repositories, and wherein said rules-blocks are users of the network having a digital identity consisting in the pattern of said links.

According to a second aspect of the present invention, a computer-implemented method for secure transactions between users of a network is carried out by the computer-implemented system according to the first aspect of the present invention, the method comprising the steps of:

- a) submitting a transaction between at least two users of the network, said transaction comprising at least one Smart Contract, said Smart Contract comprising rules;
- b) authorizing the transaction;
- c) executing the at least one Smart Contract;

and characterized in that the method comprises a step of:

- d) adding at least one new block to at least one blockchain of the computer-implemented system, on the basis of the rules defined in the Smart Contract; and the consensus for addition of the at least one new block is automatically granted on execution of the Smart Contract.

In the computer-implemented method, the step d) of adding a new block to at least one blockchain consists of:

adding a new block to at least one private blockchains and to at least one of Trust function blockchain of each of said two or more users;

and wherein:

the step of b) of authorizing the transaction comprises the steps of:

b1) authenticating the identity of the users involved in the transaction, preferably by their fingerprint and/or their footprint;

b2) optionally verifying Trust of the users involved in the transaction, preferably by means of the Trust Function blockchain;

b3) authorizing the transaction if all users accept and satisfy all the rules of the smart contract.

The computer-implemented method may be carried out by the system according to the first aspect, wherein acceptance of the rules-blocks by the users improves the Trust of the rules-blocks.

In the computer-implemented method, the consensus mechanism is deployed through the rules-blocks.

These and other purposes are achieved by the computer-implemented system and the computer-implemented methods according to the invention, as defined in the appended claims.

BRIEF DESCRIPTION OF THE DRAWINGS

The characteristics and advantages of the present invention will become apparent from the following detailed description, the embodiments provided by way of non-limiting examples and the Drawings annexed hereto, wherein.

DETAILED DESCRIPTION OF THE INVENTION

Figure 1A:
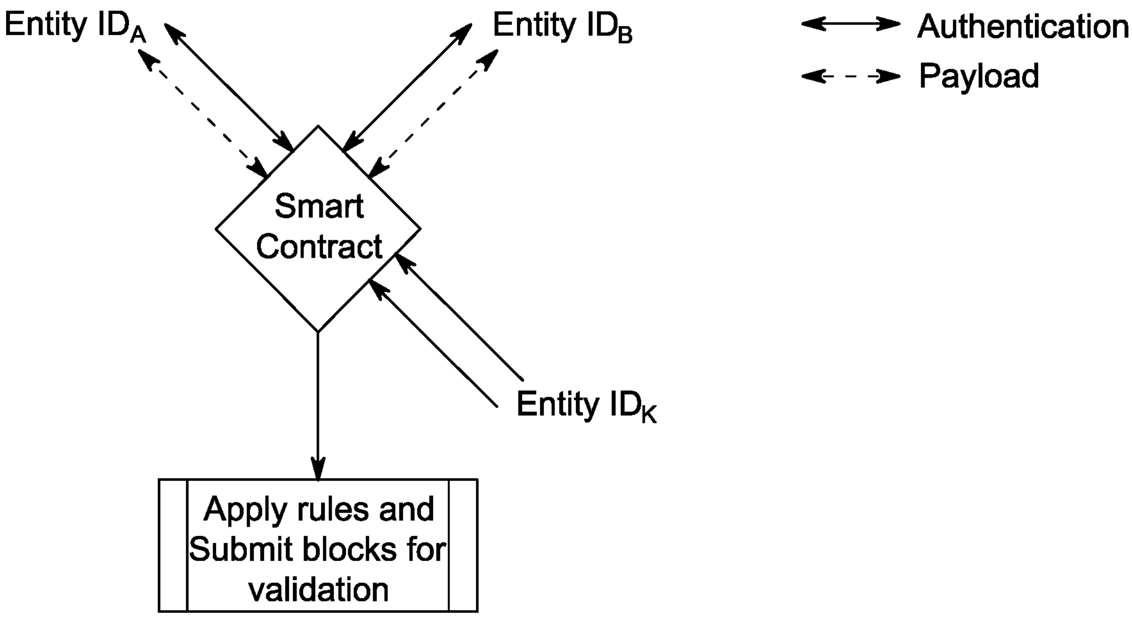
FIG. 1A shows a scheme of a computer-implemented system according to the invention and employing a PUF as fingerprint.

With reference to the first aspect of the present invention there is provided a computer-implemented system for transactions between users of a network that comprises:

a network comprising a plurality of blockchains, each comprising at least one block linked by a cryptographic key to other blocks of the same and/or different blockchains;

a plurality of users accessing the network, at least one transaction between two or more users of the network, comprising at least one Smart Contract;

wherein the Smart Contract comprises rules that determine addition of new blocks to at least one of said blockchains upon execution of the Smart Contract, wherein the new blocks added are linked by a cryptographic key, preferably wherein the new blocks added are also semantically linked.

Preferably, the rules of the Smart Contract are negotiated by the two or more users involved in the transaction.

Preferably, the plurality of blockchains comprise:

private blockchains, wherein each user owns at least one of the private blockchains and public blockchains, providing search tools for searching digital information recorded within;

when the Smart Contract is executed, at least one new block is added to at least one of the public blockchains and at least one new block is added to at least one of the private blockchains owned by each of the two or more users.

Preferably, semantic links between two or more blockchains of the computer-implemented system are determined by the rules of the Smart Contract.

Optionally different rules are set in a Smart Contract at each interaction: each transaction can thus include a Smart Contract having rules that are different from any other Smart Contract's rules.

Preferably, each type of transaction includes a Smart Contract comprising a predetermined set of rules; more preferably, users involved in a transaction select a subset of rules to be applied among the predetermined set of rules of that transaction.

Typically, the cryptographic key linking the blocks comprises a Hash function and a Timestamp.

Preferably, the blocks in the computer-implemented system are linked by a first hash function to other blocks of the same blockchain and by a second hash function to the blocks of different blockchain(s).

In the context of the present invention, the term "blockchain" is used for indicating a distributed ledger database based on a blockchain protocol or a Distributed Ledger Technology (DLT), for brevity.

Frequently, the term smart contract is used in the art to indicate an automatically executed program. However, in the context of the present invention, the term "Smart Contract" (SC) is used to indicate a contract involving two or more users and comprising rules agreed by the same users. Preferably, the rules of the Smart Contract are agreed to on an each transaction basis and are thus not fixed once and for all, so that execution of the Smart Contract requires agreement on the rules. The nodes of the blockchains of the system of the invention are the same users involved in the transactions, who negotiated the content of the Smart Contracts.

Blocks of different blockchains are "semantically linked" when containing a same hashtag, keyword, number, or string. Preferably the hashtag is defined in the Smart Contract rules, identified by the type of transaction. For instance, all the blocks of different private blockchains, of the same or of different users, relating to bank transactions can be semantically linked by a common hashtag (e.g., #bank), being thus all searchable by this common hashtag in public blockchains linked to the private blockchains, if users decide to make this information publicly available in a certified way as defined in the Smart Contract. As a further example, all the blocks relating to money transactions of the same amount can be searchable by the amount (i.e., by a certain number). Optionally standard search tools or functions can be used, in particular if no certification is required and if governance and sovereignty over data is not an issue.

A "User", as defined herein, is a subject accessing the network of the computer-implemented system through a computing device or protocol.

A user can be a person using a computing device, or it can be an object comprising (being connected to or having embedded within) a computing device, accessing the network; the user can also be an entity, such as a bank or government.

In preferred embodiments of the invention, at least one of the users of the network is an object; more preferably it is an object with artificial intelligence.

Each user of the network has a physical identity and a digital identity, by means of which said user is univocally identifiable.

In preferred aspects, each user is associated to at least one fingerprint, for authenticating the user. The "fingerprint" preferably is a physical fingerprint, such as a Physical Unclonable Function (PUF) or a secure element. Any digital identity (such as account with password) can also be used for authenticating a user, but with a lower security level Smart Contract.

Furthermore, each user is preferably associated to at least one footprint blockchain for tracking all the transactions involving the user and comprising the blocks of private blockchains owned by the user.

Preferably, the new blocks added to the blockchains of the computer-implemented system comprise digital information relating to the transaction; preferably, the new blocks added to the private blockchain comprise digital information relating to identities of the users.

Preferably, in the computer-implemented system of the invention, at least one public blockchain is associated to each user, recording a set of parameters that define the user's trust (Trust Function blockchain). Each time a transaction is carried out by a given user, its Trust function blockchain is implemented by addition of a new block, thus implementing the parameters that define the user's trust on the basis of an algorithm that is preferably defined in the Smart Contract. Preferably the plurality of public blockchains of the computer-implemented system of the invention comprise tools for determining trust of a user on the basis of its Trust Function(s).

Consensus on the Trust Function is automatically granted upon execution of the Smart Contract. Therefore, the computer-implemented system of the invention preferably has a proof-of-stake consensus mechanism based on the same procedure of Trust function blockchains: the level of Trust granted to a user upon authorization of a transaction and thus execution of the Smart Contract is defined by agreed algorithms (the Trust function variables set). Each time a transaction is authorized, and a Smart Contract is executed, the Trust function of an involved user increases its value. Therefore, each time a Smart Contract involving two or more users is executed, the Trust function of the two or more users is enhanced in a totally decentralized way. In case of breach of security of a blockchain or of user mis-behavior, the Trust Functions' value of the blockchain/user are decreased according to a pre-defined set of parameters/rules.

The parameters that define a user's trust can be used as a Proof-of-Stakes Indicator in any blockchain protocol.

Preferably, each user is associated to a plurality of Trust Function blockchains, each recording parameters relating to a specific category of transactions, such as financial transactions, service transactions, information transactions, or to a specific category of information, such as education-relating information, personal data, etc.

Depending on the category within which the transaction falls, the Trust Function of said category is implemented. The Trust Function of a given user and associated to a given category can be then seen as a weight function making the user more reliable with regards to a given field, such as in education, sales, bank transfers, etc.

The Trust function public blockchains of the system of the invention thus participate in determining the identity and trustfulness of the users of the network, together with the fingerprint and the footprint.

Preferably, quantitative search is available within the Trust function public blockchains, in order to evaluate trustfulness of a user.

Then the consensus mechanism for authentication of the users' identities can be based on an algorithm determining the weight of one or more user's Trust function(s).

For example, if a VAT office is implied in a transaction, it will provide more weight to the transaction than a simple citizen; also, if a user had made a lot of sales for a product, the weight of its Trust Function will make the user recommended for said product's sale, or again, if a user has a lot of expertise in a technical field, his recommendations will be more valuable than those of a beginner in said field.

Preferably, the Smart Contract rules determine creation or update of the Trust function public blockchains of the users involved in the transaction, by recording Key Performance Indicators (KPIs) that support trust of the users in a measurable way. When a specific rule is created to monitor a specific KPI, a specific blockchain segment is created and a bijective relation for a given user is created with all the SC supporting the identified KPI.

Each time a new SC with a rule to implement a specific Trust Function (i.e., a rule to add a new block to a Trust Function) is executed, the related blockchain segment is improved according to a fixed algorithm defined by the SC (and previously validated by the community). If, for example, the KPI is related to the number of sales of a given company for a specific product, each time this clause is introduced in a SC, the blockchain segment of the company related to this sale is improved. The algorithm can be as simple as a simple count or can be improved according to the Trust function of the purchaser in this given field (if the field of expertise of a purchaser is to buy this kind of product, this will result in a higher level of reliability).

A proposed algorithm is the following, separated in a level of trust of a purchaser and the $\log_{10}$ of the number of purchasers accredited by this level of Trust (Trust level, TL), resulting in a number such as 1.1 to 5.10:

Trust level of non-certified customers: 1.

Trust level of average customer 2.

Trust level of standard professional 3.

Trust level of certified expert 4.

Trust level of Top expert 5.

Hence, something bought by 1000 non-certified customers would be rated as TL1.3 (trust level 1 approved by $10^3$ customers).

Something recommended by 100 top level experts would be rated as TL5.2.

Obviously, any kind of system can be put in place once a standard is accepted by the community and new systems could easily challenge and replace previous standards once validated as each SC can introduce new rules that are not fixed once for all.

An alternative algorithm can be to base the TL on expended money (cash flow) or on a hybrid system based more on a mix of KPIs.

The expended money could also mitigate counting of fake or no-value transactions to provide more trust.

Preferably, the fingerprint of a user includes a public username, more preferably several usernames, each used for a certain category of transactions but all tied to all the possible Trust Functions to grant global Trust of a unique identity. For example, if a gamer is using a nickname (avatar identity) for games, this avatar identity will be used for specific Trust Functions (such as ranking or assets ownership in a game) related to gaming, but for Trust Functions related for example to payment, Trust Functions of the main username will be used. The purpose of the avatar identities being not to create more identities, but to provide privacy for any specific context.

The present invention is therefore also directed to a computer-implemented system for providing self-sovereign identities (SSI) to users of a network, comprising

- a plurality of users accessing the network, each user having at least one digital identity, by means of which the user is univocally identifiable (fingerprint),
- a plurality of private blockchains, wherein each user owns at least one of the private blockchains whose blocks record digital information relating to transactions carried out by the user (Footprint blockchain);
- a plurality of public blockchains, wherein each user is associated to at least one of the public blockchains, whose blocks record a set of parameters that define the user's trust (Trust Function blockchain),
- wherein new blocks are added to the Trust function blockchain and to the Footprint blockchain of a user each time a transaction is carried out by the user, the new blocks being all linked by at least one cryptographic key.

Preferably, addition of new blocks to specific public and private blockchains are determined by rules of a Smart Contract (SC) that is included in the transaction.

The public blockchains provide search functions for searching digital information recorded within, and Trust referencing tools for obtaining the level of Trust of a user on the basis of its Trust function blockchain(s).

The private blockchains of the invention are accessible only to the user owning them, but their content cannot be modified by any single user alone, because they are linked to at least one of the public blockchains. Therefore, the private blockchains are capable of supporting the Trust and the identities of users.

This improves security, since in order to modify a block, an adverse party should not only hack all the chain-links of a single blockchain, but the chain-links of all the blockchains that have a block created by the same Smart Contract linked to the blockchain to be hacked.

Preferably, permission to access information in a private blockchain by users different from the user who owns it requires a new Smart Contract.

The private blockchains store information with a user-centric model approach and public blockchains reference/certify users' identities and provide trust between parties.

A "sidechain" (also known as blockchain segment) is typically a separate blockchain that is attached to its parent (or main) blockchain. Sidechains have been developed to increase security and scale up of blockchains. Also, sidechains improve speed (TPS): making blockchains less consuming, with limited synchronization and with more flexibility to organize data.

The plurality of private blockchains comprises or consists in a plurality of private sidechains linked to at least one of the public blockchains (parent chain) by the Smart Contract and the Trust Functions. Preferably the Trust function blockchain is a sidechain of a parent public blockchain or it is a parent blockchain, to which sidechains are linked.

Sidechains according to the invention can be based on any blockchain protocol (such as Bitcoin, Ethereum, Hyperledger, or others).

In preferred embodiments, each user owns a plurality of sidechains.

More preferably, each sidechain stores digital information relating to a specific transaction type (semantic field), or to a specific group of transaction types, as defined by the type of goods that are transferred. Transaction types are for instance: financial transactions, services transactions, information transactions, etc. According to preferred embodiments at least two sidechains are semantically linked.

The semantic organization of the information makes it possible to provide several identities to each user (avatars) that can be cross-referenced and unified in a single user identity.

Preferably, several identities of a user from different blockchain platforms can merge into a single identity or blockchain platform through cross-referencing by the Trust function, thus enabling full interoperability between different platforms.

With reference to the second aspect of the present invention, a method for secure transactions between users of a network is carried out by the computer-implemented system of the invention, the method comprising the steps of:

- a) submitting a transaction between at least two users of the network, the transaction comprising at least one Smart Contract, the Smart Contract comprising rules;
- b) authorizing the transaction;
- c) executing the at least one Smart Contract;
- d) adding at least one new block to at least one blockchain of the computer-implemented system, on the basis of the rules defined in the Smart Contract;
- wherein a consensus for addition of the at least one new block is automatically granted on execution of the Smart Contract.

Preferably, where the plurality of blockchains comprises:

- private blockchains, wherein each user owns at least one of the private blockchains and
- public blockchains, providing search tools for searching digital information recorded within, wherein
- the step d) of adding a new block to at least one blockchain consists of:
- adding a new block to at least one of the private blockchains owned by each of the two or more users and to at least one of the public blockchains, more preferably wherein the new blocks added are semantically linked.

Preferably, where the plurality of blockchains comprise:

- private blockchains, wherein each user owns at least one of the private blockchains and
- public blockchains, providing search tools for searching digital information recorded within,
- and where each user is associated to at least one fingerprint, for authenticating the user, and to at least one footprint for tracking all the transactions involving the user, the at least one footprint comprising blocks of the private blockchains owned by the user, the step of b) authorizing the transaction comprises the steps of:

b1) authenticating the identity of the users involved in the transaction, preferably by their fingerprint and/or their footprint;

b2) optionally verifying Trust of the users involved in the transaction, preferably by means of at least one public blockchain associated to each of the users, the public blockchain associated to the user recording a set of parameters that define the user's trust (Trust Function blockchain);

b3) authorizing the transaction if all users accept and satisfy all the SC rules.

Preferably, the step of b) authorizing the transaction comprises a further step of: selecting the rules of the Smart Contract among a set of predetermined rules, wherein the step of selecting the rules precedes the step b3) of: authorizing the transaction or the step b1) of authenticating the identity of the users.

According to the present invention a "transaction" can include transfer of physical or digital goods between at least two users.

"Digital goods" in the context of the present invention include (raw or elaborated) data, software programs, services, digital values, optionally representing physical goods (such as bitcoins or other cryptocurrencies without being exhaustive), and digital information in general.

"Digital information" can include information relating to the transaction, such as information on the goods exchanged, information of the terms negotiated in a Smart Contract, etc., as well as information relating to all the identities of each user involved in the transaction.

Preferably, the digital identity of the users can be authenticated by one or more authentication method. More preferably, the one or more authentication method to be used is defined by rules of the Smart Contract. A minimum level of Trust can be introduced in the SC to limit the authentication methods/protocols to the most secured ones.

Preferably, the elements of the computer-implemented system of the invention are connected to each other through any suitable hardwired and/or wireless means, being capable of communicating and transmitting digital data to each other and over the network; preferably, the elements of the system are connected through wireless means.

According to the present invention, the Smart Contract's rules determine how new blocks are added to pre-existing blockchains (i.e., to which pre-existing blockchain) and therefore how blocks of the blockchains are linked together, within the same or different blockchains. Preferably the rules of the Smart Contract also determine where information (value, certification, etc.) of the transaction is to be stored, in what form and/or who has access to this information. It is then the SC that defines the blockchain network architecture and not the blockchain that defines the SC architecture. This enables more agility to change the rules and make the blockchain evolve without losing trust.

Also, any blockchain protocols can be used for private blockchain segments according to each user specification in the SC. Such blockchain segments can also be transposed to another blockchain architecture in a second step, the certification of the transposition being granted by Trust Functions.

The present invention also provides then for a Smart Contract protocol that can be implemented in any blockchain protocol either already existing or to be developed in the future.

Preferably, the computer-implemented system of the present invention is implemented on the computer-implemented system described in WO2020099629, whose content is incorporated herein by reference.

Preferably, upon execution of the Smart Contract, a new block is added to all the blockchains, associated to a specific transaction or group of transactions, of the users involved in the transaction.

In preferred embodiments, the computer-implemented system further comprises at least one digital repository, wherein the digital information, or a part of the digital information, relating to the transaction is stored. Therefore, in preferred embodiments the method further comprises the step of:

e) storing at least part of the digital information of the authorized transaction in at least one digital repository.

A "digital repository" is any medium or digital system capable of storing digital information. Examples of suitable digital repositories are: a hard disk, a cloud, a fog, a mailbox, a storage device, or whatever combination of all these solutions. A digital repository can be digitally connected to other digital repositories through the network for data sharing, such as Internet.

In preferred embodiments of the invention, the digital information can thus be stored in one or more blockchains (or sidechains) or in one or more digital repositories linked to one or more blockchains.

Preferably, the computer-implemented system comprises a plurality of digital repositories, storing the digital information; more preferably said digital information is split in more than one part and each part is stored in a different digital repository of the plurality of digital repositories.

Optionally, the digital information can be stored in a distributed database (e.g., instead of a cloud database or of a local storage medium), so that different parts of the digital information are randomly stored in different digital repositories, or it can be stored in a cloud database, so that different parts of the digital information are stored in specific repositories.

Preferably, the digital information of a transaction is thus distributed in several digital repositories, ideally in one different repository for each indivisible bit of information exchanged in a SC involved in the transaction.

Preferably, the set of rules of the Smart Contract further comprises rules that define in which digital repository the digital information of the authorized transaction will be stored upon execution of the Smart Contract. This is preferentially managed by involving storage providers as secondary/service users in the SC as chosen/sorted by main users.

Preferably, when the digital information is stored in one or more digital repositories, upon execution of the SC the digital address of said one or more digital repositories is recorded in the new block that is added to the at least one blockchain, according to the rules of the Smart Contract. The digital address can be recorded for instance in the form of a hyperlink or in any other suitable form that creates a connection to the digital repository.

In preferred embodiments, the new blocks, added to the plurality of blockchains on execution of the Smart Contract, provide a link (a Hyperlink) towards one or more repositories wherein digital information of the transaction is stored. Repositories are then a sort of intermediary block (a blockin-the-middle) shared between different blockchains, not belonging to any blockchain in itself (and being not linked to any other repository directly, unless specified in an evolving/updated Smart Contract).

Preferably, the blocks in the computer-implemented system are therefore linked by a hash function to at least one digital repository.

Access to digital information, or to each part of the digital information, is protected and available to one or more users, as defined in the Smart Contract.

Each part of the information has its own identity protocol to enable its authentication, traceability, organization rules and certification.

For instance, a protected link to the digital repository can be stored in a block of a decentralized ledger and the digital information can be made available upon authentication of the user identity, according to what is defined by the Smart Contract rules. The link can be correlated to a hash function and availability checked to avoid any collision.

Also, the pattern of the links between blocks of several blockchains, Smart Contracts and repositories provides an evolutive, not fixed, fingerprint for digital information, thus defining a self-sovereign authentication protocol for authenticating also digital information, that can then be a user of the network with self-sovereign identity.

Access of users to the digital information stored in one or more digital repositories is defined by the Smart Contract, according to the users' preferences.

Also, access to the digital information can be either public or private as defined in the Smart Contract.

Preferably, rights and duties of access to private blockchains and to information recorded therein are defined by rules of the Smart Contract.

Optionally, the users of the network may have access only to one or to several digital repositories or blockchains storing the digital information, but not to all, having thus access only to a portion of said digital information, as defined in the Smart Contract.

Preferably, the set of rules of the Smart Contract further comprises rules that define the duties and rights of the users of the network on said digital information (i.e., access rights to the digital repository or to partitions of the digital repository, to one or more blockchains, and rights on the information, such as right to read or write said information).

Access to digital information can be determined by a password access protocol supported by the identity of each user. Preferably, a different password is generated each time that access a given repository is requested.

Preferably, the rules of the Smart Contract are selected by each user: some are customized for each-other and some are common to all users, such as those imposed by some regulating entity.

In an exemplary use case, a financial transaction is authorized and a Smart Contract is executed, whose rules determine that information relating to the transaction is stored on Bitcoin blockchain as required by one user, on HyperLedger as required by a second user and on a ledger with a semantic approach (such as a bank account), or on a private ledger, or on the cloud, for a third party. If some information of some physical good are also involved in the transaction, the users could define new blockchain segments where to store the certificate of ownership or the information shared, the object itself being considered as a user such that it can store in its own blockchain its certificate of ownership. As a rule of thumb, any kind of Key Performance Indicator can lead to a specific blockchain segment as defined by each user.

This provides extreme agility to achieve a user-centric approach as each user can define precisely where to store the information, to have full control over it and achieve efficient management of its own footprint.

A new blockchain segment is preferably created for each new type of transaction involving a given user, based on a pre-defined standard architecture. This will enable organization of the information with a semantic approach common to the wider possible number of users still allowing flexibility and agility.

For instance, an accounting rule related to money exchange in the SC can determine addition of a new block to each side-chains of the users involved in the money transaction, or a certificate of ownership in the SC can determine addition of a new block to each side-chain of the users involved in the ownership certificate transaction (e.g., users involved in acquiring or selling or an object itself whose identity is tied to its owner, etc.).

According to the present invention, pre-defined Smart Contract templates can be used to define rights and duties of each user.

The computer-implemented system of the invention preferably comprises at least one pre-defined Smart Contract template, comprising a pre-determined set of rules that are specific for a given transaction in a given country (e.g., to account for local legislation). Therefore, upon submission of a specific type of transaction, a Smart Contract template can be sorted among a range of pre-defined Smart Contracts templates suitable for that type of transaction without involving (or to a lesser extent) users themselves, each block of the SC being pre-validated by an open community.

Therefore, according to preferred embodiments, the rules of a smart contract can be automatically defined by a public blockchain, whose Trust is improved by execution of the smart contract. Therefore, the public blockchain can then act as a user of the network, having a self-sovereign identity with a Trust Function.

Preferably, the digital information of a transaction includes personal information of users involved, such as information of said users' identity. Preferably information of the user's identity is partitioned into different digital repositories or blockchains of the users.

Preferably the set of rules of the SC includes several independent rule-blocks for each aspect of the transaction, such as for each information, value, certification, that is exchanged, if one or more financial transactions are carried out, what rules on users' identities are applied, what kind of certifications are issued, etc. The rule-blocks rules-blocks are organized according to users' negotiation. The rule-blocks are certified, traceable and Trustful.

The method of the invention preferably comprises the step of:

verifying identity (authentication) of the users and authorizing the transaction, if identity of users is validated.

Preferably, identity of users is verified by one or more authentication methods, said one or more authentication methods being defined in rules of the Smart Contract.

Preferably said authentication mechanisms to verify identity of a user and to determine if a user can be trusted are based on the Smart Contracts history of said user through the Trust Functions, comprising all the SCs executed upon authorization of transactions by said user, said SCs being linked and merged into the plurality of private blockchains owned by said user (footprint), and/or on the Trust Function of said user, according to the proof of stakes mechanisms defined in the Smart Contract.

Preferably, the Proof of Stakes mechanism for authentication of the user identity and authorization of the transaction can be freely defined in each SC, optionally being selected within a given set of possibilities provided by SC templates.

Still, new rule-blocks can be added after being reviewed and accepted by the community of users for new contracts. The strength of Trust of each rule-block is hence quantitatively assessed by the community enabling also a decentralized protocol for new regulations, that will be very fast, simple, cost-effective and representative of the community.

This provides multiple proof-of-Stake (POS) consensus mechanisms based on fingerprint, footprint and Trust function(s) of a user, said PoS being able to limit possible actions of users.

For instance, the capacity of a user to edit rules and check if and how the rules are applied or enforced can be reduced when their reputation (Trust) is impacted.

Such consensus mechanism can be deployed through modular rules-blocks being "data with self-sovereign identity" and with the capacity to act as "template substitutive user" for automatization in the definition of the Smart Contract rule-set.

The computer-implemented system of the invention then provides a network of private and public blockchains, having the advantages of either public or private blockchain, whose architecture is defined by executed Smart Contracts.

Trust Functions stored on the public blockchains have several advantages.

1. Public blockchains provide a way to protect the users of an application from the developers, establishing that there are certain things that even the developers of an application have no authority to do. First, if one explicitly makes it harder or impossible for himself to do certain things, then others will be more likely to trust him and engage in interactions with him, as they are confident that those things are less likely to happen to them. Second, it discourages third party entities from trying to pressure or coerce users and developers of an application to do something.
2. Public blockchains are open, and therefore are likely to be used by many entities and gain some network effects. Transfer of goods is immediate as Smart Contracts are executed automatically upon authorization of a transaction, thus solving the standard counterparty risk problem; also, the program is trusted because it runs on a public blockchain (rules-blocks).
3. The advantage of Public blockchains to manage Trust is that Trust defines the value. Hence earning money by losing Trust will not be a good bargain anymore as the level of Trust of any user will be made public and anybody will be able to check it.

Private sidechains linked to public Trust function blockchain have further advantages.

1. The first advantage is privacy. User data are protected and not exposed to everybody. This is a mandatory asset because of the General Data Protection Regulation (GDPR) in the European Union (EU), and other worldwide regulations, for private citizens, but also to protect business sovereignty and governance.
2. The validators are known, so any risk of a 51% attack arising from some miner collusion does not apply. The consensus of the Smart Contract is such that they are the users involved in the SC themselves that define the "local truth" tied to each SC.
3. Transactions are cheaper and faster, since they only need to be verified by a few nodes (users involved in the SC only) that, because of their direct implication in the SC, can be trusted.
4. Nodes can be trusted to be very well-connected, and faults can quickly be fixed by manual intervention if needed by involving just a few users without changing the rules of the public blockchains, for instance by issuance of a new Smart Contract between users.
5. If read permissions are restricted, private blockchains can provide a greater level of privacy.
6. Usually, the consortium or company running a private blockchain can easily change the rules of a blockchain, revert transactions, modify balances, etc. In some cases, e.g., national land registries, this functionality is necessary. In the present invention this does not occur as a Timestamp is sorted and coordinated with all the other blockchain segments though public blockchains and repositories, making of it a very tamper-proof process. A Hash digest of the SC itself and any auxiliary data is generated by all the users involved in the SC and hence it is not possible for any user to modify the information once issued, as it would need to revert the message digest from hash function used (what is impossible even with the most powerful computers) and at the same time do it for all users involved in the SC in real time.
7. Unlike what happens in standard blockchains, in case of failure (loss of cryptographic certificates, access PW, hacking, etc.), repristinating of rights can be easily re-established as the full footprint is connected to user identity and because multiple copies (with much lower redundancy than with standard nodes) is available through all other users involved in the various SCs experienced by any given user. Disrupting consistency of the system is just impossible just by hacking a single block and rights loss is impossible.

The rules of the Smart Contracts of the invention determine the architecture of the blockchains of the system, by defining how said blockchains interact with each other in a complex network of blockchains.

Preferably, the rules of the Smart Contracts determine the creation of a hash function based on the hyperlinks stored in each block (or vice-versa the hyperlink is generated by the hash function) of a given user's sidechain and on all the users' hyperlinks for a given transaction or on the previous blocks in all the sidechain blocks of each user.

This is to guarantee that each user of a given transaction contributes to the hash function, making a strong security reticulation between the blocks of all the independent blockchains and avoid manipulation of data by a single user.

Also the rules determine how blockchains of the system can be used to provide a footprint to support identities of users.

As an example, a Smart Contract according to the invention can comprise rules that define what kind of certification identifying a user is issued upon execution of the Smart Contract.

As a matter of fact, each interaction can have its own rules and can hence support extreme agility in negotiating the contract.

This system provides Self-sovereign identities to users.

In a further aspect, the present invention is then directed to a method for providing self-sovereign identity to a user of the network of the computer-implemented system described above and in particular to objects as users of the network, wherein said self-sovereign identity can be authenticated by means of a footprint based on the private blockchains of the user and on Trust function blockchain.

The aim of the method is to assist people in managing access to several private sidechains or digital repositories by identification processes as well as to enable objects to self-manage the identification processes providing self-sustaining and self-sovereign identities (SSIs) for objects and support more secure cyber-security and cryptography protocols.

"Self-sovereign" means that the identity is not controlled by any authority and as such cannot be modified, withdrawn, abused or denied by such an authority that is the necessary requirement to enable full interoperability between different platforms (avoiding any uncontrollable privileges to the controlling entity against the others).

Each object is hence not depending on a platform governing/certifying his identity/defensive system. This is the only way to make objects really self-standing and with capacity to manage transactions, analyze and organize data by themselves.

The system and methods of the invention provide a network of users constituting an internet architecture, possibly involving objects (Internet of Things (IoT)) or value (Internet of Everything (IoE)), where all the information is certified, traceable and trustful and shared between users in a Private or Public access based on Smart Contract defined rights, such an internet being a Digital Twin where information is updated in real time through the support of objects with artificial intelligence and where users' IDs and SC rules contribute to support a collective (swarm) artificial Intelligence.

Preferably, the method for providing self-sovereign identity to a user also includes providing to each user a fingerprint comprising a physical unclonable function (PUF) able to sustain a user-centric cyber-security system not relying on any platform and managed by each object individually.

In preferred embodiments, the method of the invention thus further comprises the step of:

authenticating a user identity by means of the user's PUF.

As an example, one user triggers the Smart Contract while involved users authenticate themselves and the rules defined by the Smart Contract are followed. A scheme is shown in FIG. 1A.

Preferably, identity of users is then verified at physical and digital level by both fingerprint (authentication by means of PUF) and a full footprint (track record in private sidechains and trust function). For "people" users' authentication, e-mails, digital accounts, governmental accounts or any other authentication (each one with its level of trustability) can be used. As for objects these authentication systems are not available and PUF (or other hardware secure element, such as an HSM (Hardware Security Modules), etc.) system is preferred.

In preferred embodiments, the consensus mechanism for execution of the Smart Contract of the computer-implemented system of the invention comprises a Proof-of-Authentication consensus method assisted by a PUF, more preferably by a physical-chemical Multi-Value-Logic PUF.

Preferably PUFs to be employed in the system and method of the invention are based on a micro/nano-patterned thin film, displaying a plurality of different chemical and physical properties simultaneously, whose measurement returns a value. For instance, said properties can be optical (transmission, refractive index, scattering, optical thickness, etc.) or electrical (dielectric constant, capacity, electrical resistivity or resistance, impedance, etc.) or other material properties (magnetic, geometric, chemical, etc.) that are measurable and whose measurement returns a value.

Preferably, the PUF comprises a patterned thin film, more preferentially a patterned oxide thin film, displaying a plurality of different properties selected from optical, electrical, topographic, mechanical, thermal, magnetic, chemical properties, and of any combinations thereof. A matrix of dots is provided in the PUF, each dot having one or more physical or chemical property; a string of values can be extracted from reading/measurements of a limited number of dots of a PUF. The combination and sequence of the values in each string can provide a password.

From a top-view perspective, the PUF is like a QR-code (an X-Y array of dots/pixels) consisting in N dots, each one displaying a number of different measurable properties and output values.

The PUF properties can be measured/read either by an external reader or by a monolithically integrated (or assembled) one, consisting in an optical or electric circuit or by both.

Preferably, the PUF is a multi-dimensional library of Challenges Response pairs (CRPs) obtained by material properties measurements stored in the material itself. More preferably, the PUF comprises a monolithic integrated reader.

This PUF, according to preferred embodiments of the invention, is thus a library of values obtainable by measuring one or more of its material properties at one or more points of the PUF; the PUF can generate authentication codes composed from a random string of the values. The authentication code can thus be generated by measuring material properties of a subset of points, obtaining values, randomly combining a string of the values and transposing it into a code by an algorithm. For instance, 100 to 10,000 different values can be obtained for each dot of the PUF leading to a Multi-Value-Logic circuit.

Preferably, each user owns a different PUF that cannot be reconfigured.

Said PUFs can be obtained by the production process disclosed in WO2015140731, whose content is incorporated herein by reference.

Figure 1B:
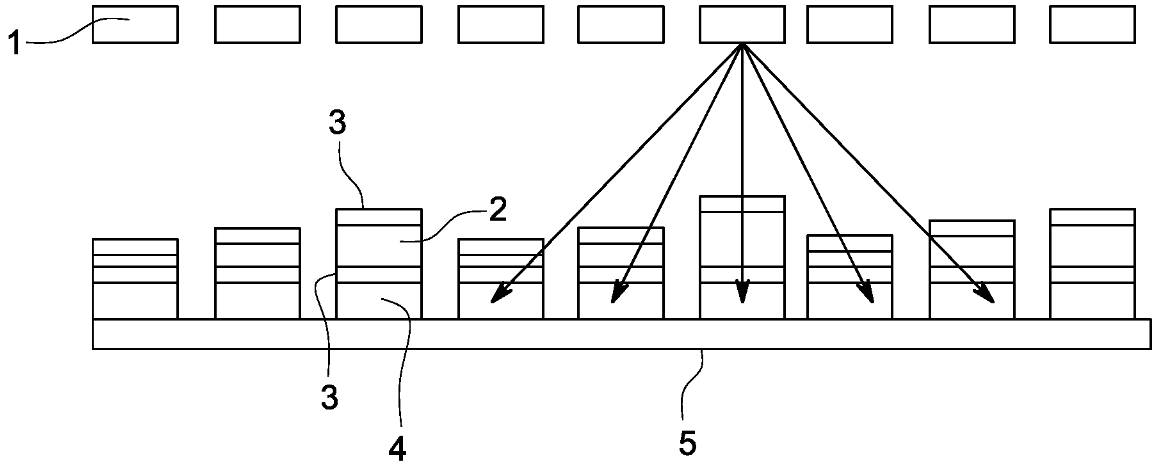
FIG. 1B shows a simplified side view of the architecture of a PUF according to preferred embodiments of the invention.

According to preferred embodiments, the PUF consists of an array of individual cells (dots) each consisting of a stack of elements on a substrate. FIG. 1B shows a simplified side view of the architecture of a PUF according to preferred embodiments of the invention (1=LEDs; 2=dielectric fingerprint; 3=TCO electrodes; 4=CMOS sensors pixel; 5=substrate).

In preferred embodiments said elements from bottom (substrate) to top are:

1. a CMOS sensor 4 capable of detecting light
2. a patterned transparent electrode 3, being a transparent conductive oxide (TCO), preferably with standard Memories architecture or with similar combinatorial approach as used for the patterned film to provide new properties to the device (varying resistivity for example by varying thickness and/or electrical conductivity (chemical composition));
3. a dielectric transparent and insulating thin film 2, having variable thickness/chemical composition at each dot or being a composition with several properties.
4. A second transparent patterned electrode 3, preferably with standard Memories architecture;
5. A light source 1, preferably a micro-LED, whose light can be measured by different sensor pixels of the CMOS sensor (at different angles).

In the case of a pure optical architecture, the Memory-like architecture and the transparent electrodes can be dropped, while for a pure electrical architecture, the LEDs and CMOS sensor can be dropped and the TCO can be replaced by a metallic electrode.

The PUF of the invention provides a non-binary Multi-Value-Logic response (not a limited black or White, 0 or 1, etc.) as the output retrieved by reading/measuring the plurality of properties can have 10, 100, 1000, or even more, different values depending on the interrogating and sensing devices and circuitry.

Preferably, for each PUF is provided a twin PUF, having identical measurable chemical and/or physical properties in every point. Said twin PUF can be employed as described in WO2020099629.

The role of the Twin PUF is to avoid enrolment of CRPs (Challenge and Responses Pairs) and the use of a digital database to store such CRPs. Enrolment is practically impossible due to a too large library of values (that we define as an Ultra-Hard PUF) that would require a too large standard binary memory to record (digitalization is not economically viable), preventing recording/cloning of the CRPs and granting unclonability both at physical and at digital level.

Preferably the fingerprint comprises several uncorrelated PUFs (randomly associated), so that each generates different parts of the code. Even with the possibility to replicate each individual PUF, it would be impossible to guess how the several PUFs are associated.

Preferably, the PUF of the invention is a 3 levels device: a material thin film signature with measurable properties as reported previously, a plurality of reading processes (a matrix of different questions enabling to obtain different answers from the same material dot) and finally an interpretation function (a process transforming non-binary code into a binary one through attribution of values to several successive sub-system of intervals until a binary code is reached that we will call the partition function).

For instance, the first level can be the thin film having optical properties. The second one is the reading technique, such as a light source combining different wavelengths and a sensor (or in case of electrical properties, the reading technique can measure electric capacity, resistance or impedance); the third one is the interpretation function.

Preferably, the thin film is 3D patterned so its transmittance/capacity (or other properties) varies when considering different portions of the thin film deposited on substrate. The number of locations available is noted 'N': it corresponds to the number of modules (dots) making up the PUF. The different values that can be measured for a module are mapped into intervals; the number of values is noted 'L'. The transmittance depends on the wavelength; the number of wavelengths intensities combination the light sources can generate or the different properties that can be measured (such as refractive index, optical thickness, geometrical thickness, scattering losses, etc, for optical properties), and detected by the sensor, noted as 'Z'. Making the hypothesis that measures are totally uncorrelated, the PUF can achieve $(L^Z)^N$ combinations. The targeted ranges for these 3 numbers are preferably $10^6<N<10^8$ (for 1 $mm^2$ to $cm^2$ typical surface values), $10<L<10^3$ and $10^3<Z<10^6$. To further increase the space of challenge, a partition function can also be introduced: L possible values are dispatched to q intervals with $2\leq q\leq L$. The number of surjections onto q intervals, noted $S_{L,q}$, is defined by $$\sum_{k=0}^{q}\binom{q}{k}(-1)^k(q-k)^L.$$

Figure 2:
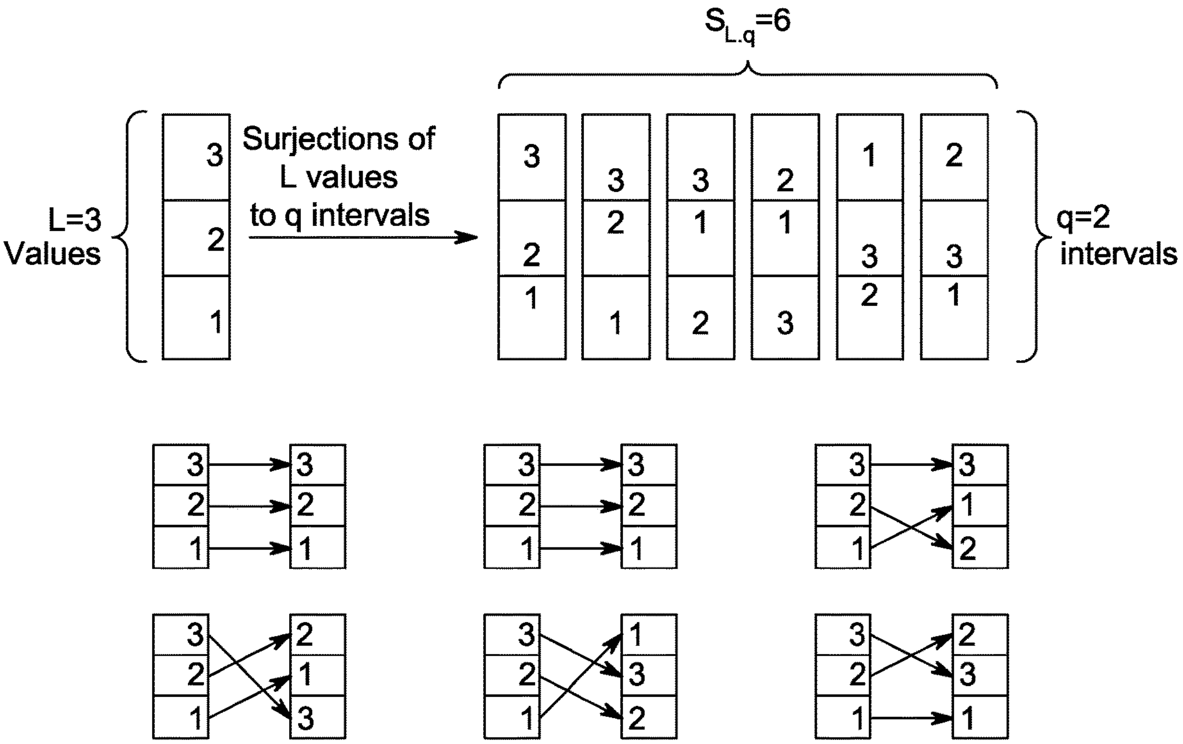
FIG. 2 shows an exemplary challenge with partition function, with surjections of 3 values to 2 intervals.

An example is presented on FIG. 2 for 3 values dispatched to 2 intervals.

Since q can range from 2 to L, there are $$\sum_{q=2}^{L} S_{L,q}$$

combinations possible per dot in total. Hence, total accessible number of combinations is increased nonlinearly thanks to the partition function.

Figure 3:
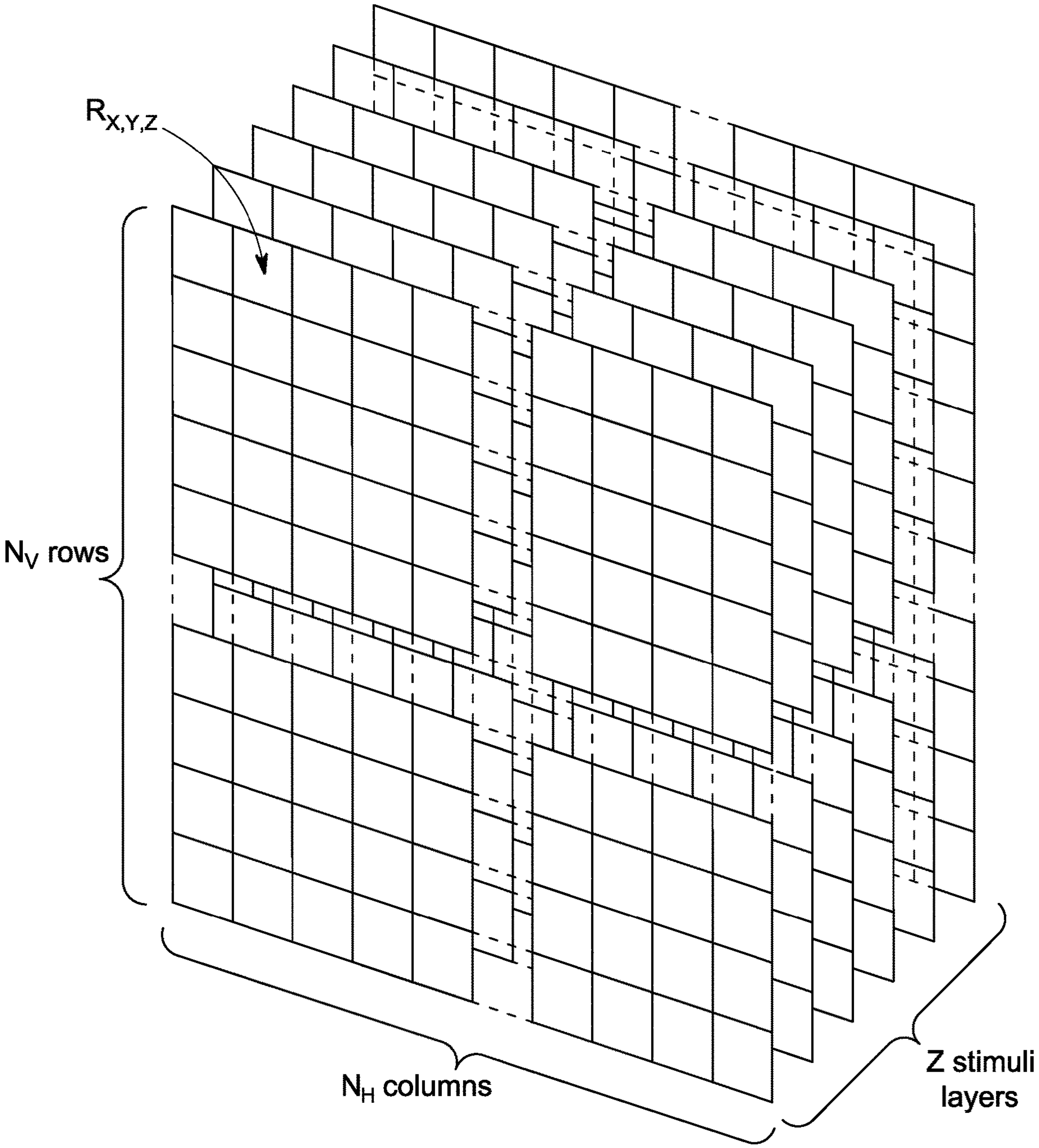
FIG. 3 schematic representation of the twin PUF space, with the N locations represented by NH columns and Nv rows on Z planes, with each cell corresponding to a word of 10 bits.

As an example, it is possible to estimate the upper limit with $L=10^3$; $N=10^8$; $Z=10^6$. Without partition function, it leads to $2^{9.97*10^{14}}$ combinations or approximately 125 TB. There are 1,000 values possible, so a response has to be stored on W=10 bits, and N modules with each possibly challenged by Z different stimuli. So, the memory required to store all the responses is $W*N*Z=10*10^6*10^8=125$ TB; that is the equivalent memory required to make a digital twin PUF if stored in plain text without encoding optimization. Schematically, this can be represented as in FIG. 3; the N locations are addressed by NH columns and Nv rows on Z planes while each cell corresponds to a word of 10 bits.

The size of one challenge is of 48 bits. The horizontal location of the dot ranges from index 1 to 10,000 and requires 14 bits to be stored; same goes on for the vertical location since $N=10^8$ corresponds to a grid of 10,000 by 10,000 dots. To it, one must add the bits required to specify the stimulus so 20 bits since $Z=10^6$. A digital twin is then requiring 48+10=58 bits times N*Z so 0.725 PB.

With partition function, it leads to $2^{9.06*10^{17}}$ combinations or approximately 113PB. This high encoding capacity is important in case of decay (ultra-secure single use token implementations): an area can be discarded without bricking the system until the PUF is replaced, if necessary, for the application.

Figure 4:
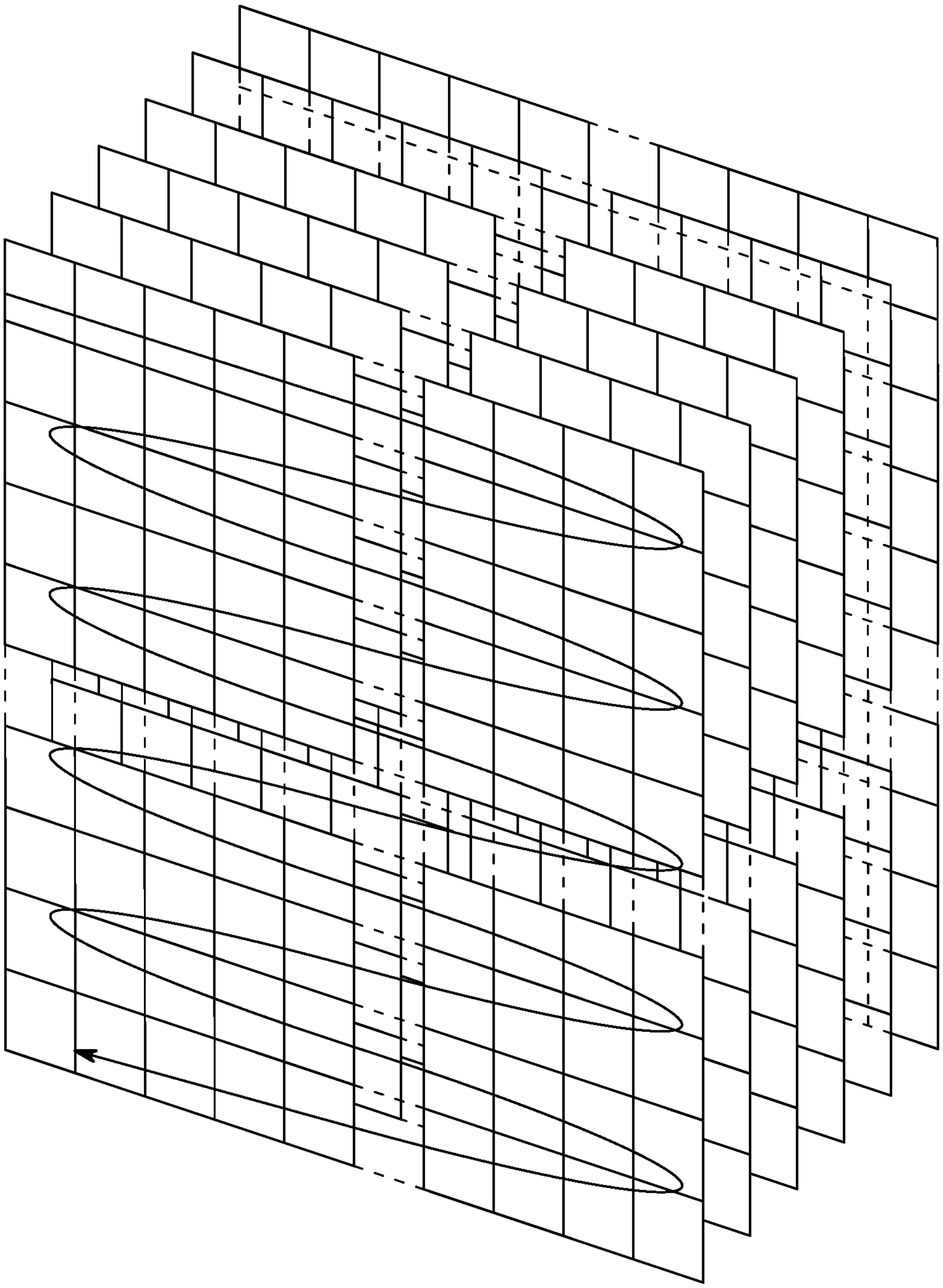
FIG. 4 schematic representation of a challenge with complete read-out of the N locations in a fixed order and sorting of reduced number of challenges among all the possible ones.

Considering the memory required to store an exhaustive CRPs list, it depends on how one challenge is defined. As an example, it can be a complete read-out of all values in a fixed order so N location. Z stimuli are possible on each dot: there are $Z^N$ challenges to list in that case. This is represented on FIG. 4; where the string defines the order of read-outs while the stimulus for each location is picked from the Z planes and colored in gray. The size of one challenge is of 20 bits to specify the stimulus since $Z=10^6$ and the size of one response is of 10 bits. The memory required to store the complete list is of:

$$\text{size for one cell} * \text{number of cells} * \text{number of combinations} = (20+10)*10^8*10^{6*10^8} = 30*10^{6*10^8+8} \text{ bits.}$$

Another possibility could be to select randomly k challenges from the space of definition of the PUF. Considering the order, k-permutations of N*Z are to consider and defined by:

$$P_k^{N*Z} = \frac{(N*Z)!}{(N*Z-k)!}$$

It is not possible to enumerate all potential challenge definition, but CRPs are combinations of elements from the digital twin space of definition such that this space is included in the space of the complete CRPs listing. Thus, the memory space required to store all the challenges is greater than the memory to store the digital twin.

This is in contrast with the CRPs as initially introduced in the literature which are just a sub-space of the space of definition of the PUF. Based on the example of an Arbiter PUF with 64 stages, there are $2^{64}$ possible challenges (while a digital twin can be stored only with 64 bits). Following a naïve approach, the exhaustive list of CRPs would be on 65 bits, 64 bits for the challenge and one bit for the response, and $2^{64}$ in number representing a cost in memory of $$65 * 2^{64} * \frac{1}{8} \approx 0.15 * 10^{21}$$

bytes or 0.15 ZB. In practice, only a portion of all possible challenges is stored. For instance, only 1 MB could be allocated for a PUF instance CRPs list on the database; considering 65 bits for one, there are close to 123,000 CRPs (or approximately 217 CRPs). It considerably reduces the potential of diversification of the PUF: only a small portion of the CRPs are used out of the total theoretically available.

As shown in the previous examples, it is more efficient to use a twin to reconstruct expected responses in close to real time.

A full challenge can be the sequence of several readings extracted from all the possible readings (a string of variable number of values comprised between 0 and L).

Several cryptography protocols can be extracted from this PUF approach, such as PW generator, random number generator, irreversible hash function generator, etc.

In a first application, the PUF of the invention is used in a method to identify and authenticate a device simply by going through the list of CRPs enrolled after production: the server managing the CRPs can challenge the PUF several rounds, check its responses to authenticate it. The server can use the twin PUF to check the response of the PUF.

| Entity $Ent_i$: $ID_i$, $puf_i$ | | Verifier Ver: Server/DB |
|---|---|---|
| $C_i \leftarrow$ Random<br>$puf_i(C_i) \rightarrow y_i$<br>$w_i \leftarrow$ Sketch($Y_i$) | | |
| $r_1 \leftarrow \{0,1\}^1$ | $ID_i$, $C_i$, $W_i$, $r_1$ → | Identify $ID_i$ DB[ID C] $\rightarrow y_i'$ |
| | | $y_i'' \leftarrow$ Recover( $y_i'$, w)<br>$r_2 \leftarrow \{0,1\}^1$ |
| Hash($ID_i$, $w_i$, $Y_i$, $r_1$, $r_2$) = $u_1$? | ← $u_1$, $r_2$ | $u_1 \leftarrow$ Hash($ID_i$, $w_i$, $y_i''$, $r_1$, $r_2$) |
| No match → Abort<br>Match → Accept Ver | | |
| $u_2 \leftarrow$ Hash($ID_i$, $y_i$, $r_2$) | $u_2$ → | Hash($ID_i$, $y_i''$, $r_2$) = $u_2$? |
| | | *No match → Abort<br>*Match → Accept $Ent_i$ |

Figure 5:
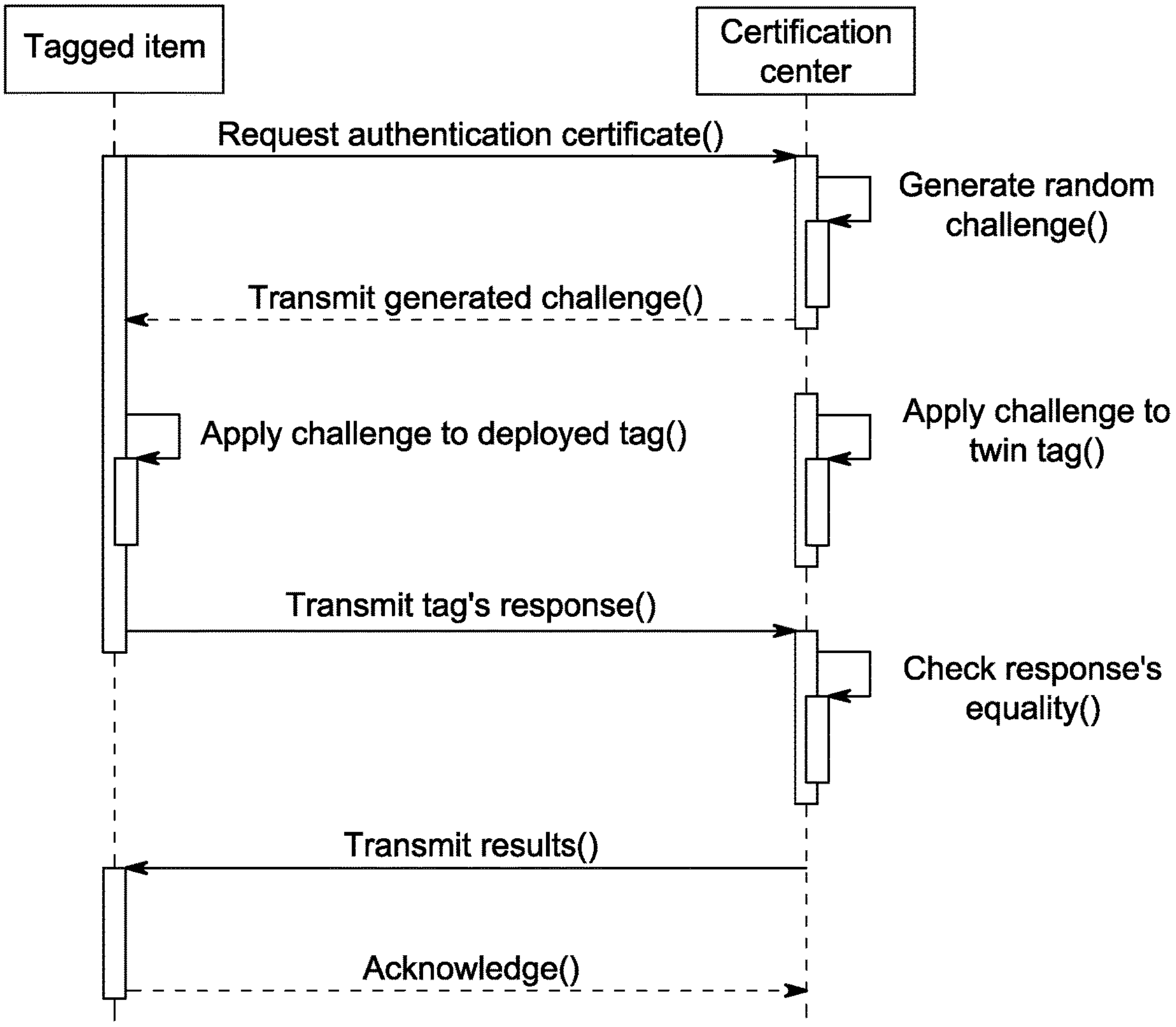
FIG. 5 shows a scheme of a basic authentication protocol by a PUF.

One example is the PUF-based mutual authentication protocol in FIG. 5. As in classic symmetric cryptography challenge-response authentication protocols, an entity proves its knowledge of the shared secret key, here the PUF response, only by showing that it can calculate a function evaluation of randomly applied challenges. The entity supports a sketching procedure to generate the side information required by the verifier to run a recovery procedure and reconstruct the response. This is necessary due to the non-perfect reproducibility of the PUF responses. Since the side information is not leaking any details about the PUF response, one CRP is enough for the life cycle of the product. In the scheme reported in FIG. 5, the random challenge generation on the entity side expresses the possibility to work on the complete space of definition of the PUF. The PUF contacts the server and provides its identifier, the side information, the challenge, and a random number r to ensure the freshness. The verification is then based on hash values produced by the server and the device. The protocol is shown below.

In the case where one device wants to authenticate to another device, it can be supposed that the server manages both twin PUFs or has the possibility to communicate securely with the concerned database. The overall scheme is illustrated hereafter. This proposal relies on encryption and message authentication code.

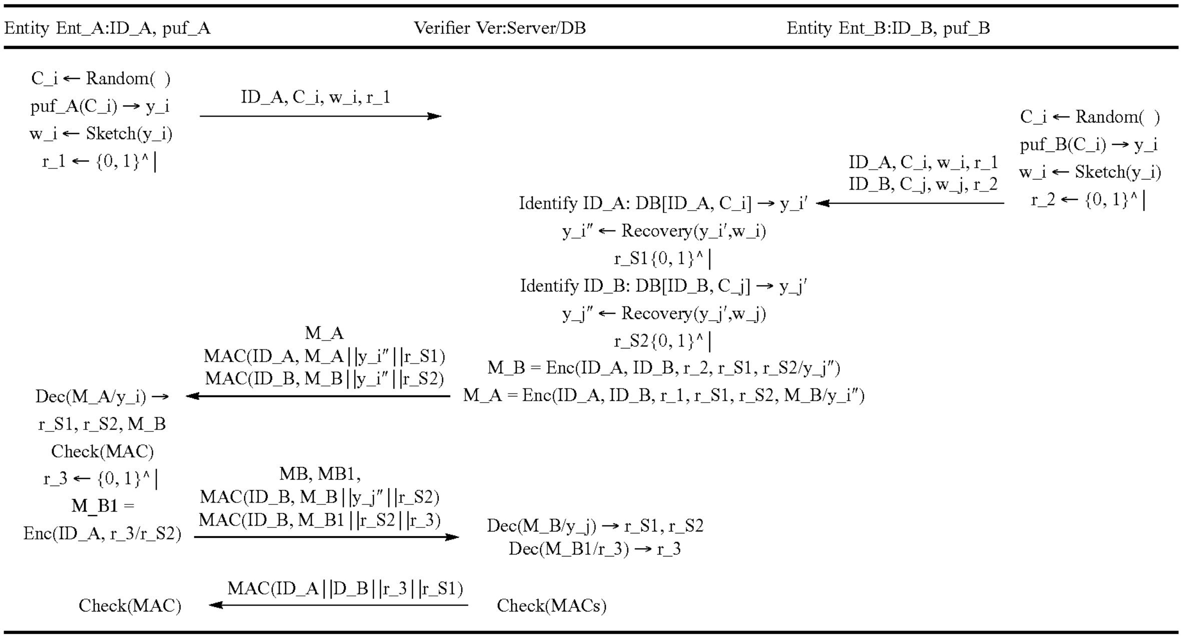

In addition, PUFs can be used in key generation for symmetric cryptography: the key is extracted from the process variation. The values provided by the PUF and its twin can play the role of the key (or a seed to generate one). Both communicating parties have the possibility to define an encryption key without having to transmit it: only the challenges applied to the PUF and the twin need to be available. To take advantage of this asset, a first phase of communication must still be established to define a partition key and the challenges to be applied. Just like systems currently in use-internet traffic, a combined approach can be envisaged. A secure communication channel is obtained by applying a key agreement protocol designed for PUFs to transmit the partition key that allows the system's capabilities to be exploited in the context of symmetrical cryptography. For asymmetric cryptography, a seed could be extracted from the values provided by the PUF to generate a pair of public and private keys by another component (e.g., secure element). More generally, the PUF could also act as a Random Number Generator. However, a bootstrap issue might appear since the responses have to be reproducible, one challenge leads to the same value and the requirement is then to generate a challenge. Finally, it could potentially be considered as a hash function if the risk of collision is limited and the output of fixed size.

Figure 6:
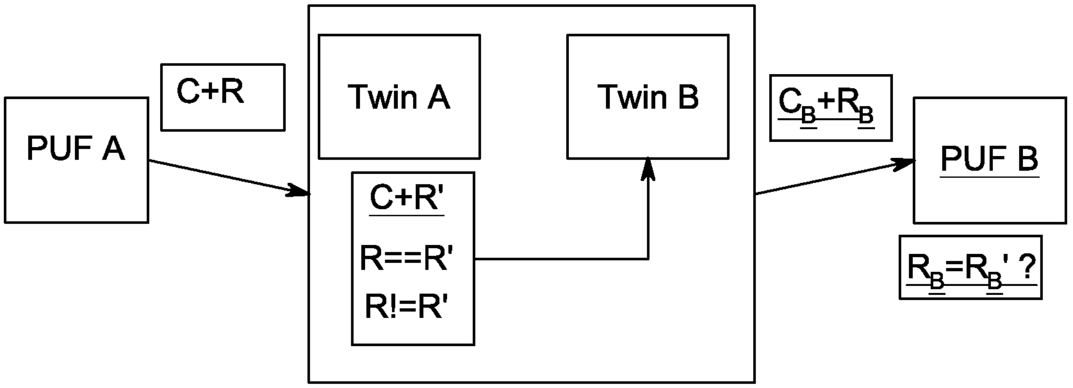
FIG. 6 shows a scheme of symmetric cryptography by PUFs.

A scheme is show in FIG. 6.

Also, it is possible to consider an additional software layer of treatment coined interpreter stored in a rewritable semiconductor memory to give raw values outputted by a sense of the PUF. Therefore, this brings the possibility to extract meaningful information thanks to the physical system and the interpreter, but also the possibility to update/change the interpreter to give another sense at the data (without having to replace the thin film). It is equivalent to the concept of character set used in electronic communications: the value measured on the PUF is a code point and the interpreter defines the associated character.

Figure 7:
FIG. 7 shows a scheme of the extraction of intelligible information from the PUF.

A scheme is shown in FIG. 7.

In order to obtain the interpreter from the values measured at the thin film level and the desired meaningful message, one option is to list the number of distinct characters present in the message. This list is the alphabet and each of its characters must be assigned to a specific value issued by the PUF (which implies knowledge of the corresponding challenge). The interpreter is the mapping between the character and the values. From the interpreter and by applying the right challenges, one can reconstruct the meaningful message. The number of challenges is the length of the list of distinct characters; the probability to measure two identical values is low due to the expected randomness of the 3D-patterned thin film hence the number of measures to carry out is in the same order. A connection with the device through a mutual authentication could be established in order to define a session key and exchange securely the required information.

It should be also understood that all the combinations of preferred aspects of the system and method of the invention, as above reported, are to be deemed as hereby disclosed.

Preferred embodiments of the present invention are disclosed in the following example.

EXAMPLES

Example 1—Smart Contract for a Sale

A Smart Contract is provided for a sale of goods according to the method of the present invention, the Smart Contract comprising:

1. definition of the users involved in the sale, including: a selling party, a buying party and a sold good;
2. definition of what is sold (such as physical good, information, values or services, among others);
3. optional definition of other users, being third parties to the transaction (such as bank managing money transactions, cloud/fog providers, government (charging tax fees or certifying part(s) of the transaction), notaries, public officers, attorneys, or other entities entrusting the transactions, etc.);
4. definition of digital information relating to the transaction;

5. optional division of said information into parts as defined by the SC
6. definition of duties and rights of each user to (each part of) the information (public or private);
7. determination of how/where the (parts of) information is/are stored according to rules provided by a ledger of each user having access to said (parts of) information with a semantic approach.

Said rules can further determine one or more of the following:

define to which user's blockchain segment a block related to the transaction is added.

define a cloud provider managing a repository for storing the (parts of) information;

create a hyperlink leading to the repository, possibly issued by a hash function, and stored in a specific block of the blockchain alternatively create a hash function based on the hyperlinks stored in each block of a given user's sidechain and on all the users hyperlinks for a given transaction or on the previous blocks in all the sidechain blocks involved in the various sidechains.

create a password access protocol supported by the identity of each users (involving one or more aspects of the user identity, such as user's PUF, user's private blockchain and trust function).

possibly create fake repositories/ledgers with misleading information.

define addition of blocks to the Trust Function of a given user for a given semantic topic (reliability, expertise, etc.);

allow access to a repository storing previously stored information.

The invention claimed is:

1. A computer-implemented system for at least one transaction comprising at least one smart contract between users of a network, comprising:

the network comprising a plurality of blockchains, each comprising at least one block linked by at least one cryptographic key each comprising a hash function and a timestamp to other blocks of the same blockchain, or one or more different blockchains, or both the same blockchain and one or more different blockchains, wherein the network is accessible by the users, each user accessing the network through a corresponding computing device, wherein the plurality of blockchains comprise:

private blockchains, wherein said each user owns at least one of said private blockchains and public blockchains, wherein said each user owns or is associated to at least one of said public blockchains;

wherein the at least one smart contract comprises rules determining that upon execution of the at least one smart contract new blocks are added to at least one of the private blockchains and to at least one of the public blockchains of said each user involved in the at least one transaction, wherein the new blocks are linked by said at least one cryptographic key, wherein the computer-implemented system further comprises:

at least one digital identity associated to said each user, for authenticating said each user, said digital identity comprising a physical fingerprint;

at least one footprint blockchain for tracking all the transactions involving said each user, said at least one footprint blockchain comprising blocks of private blockchain(s) owned by said each user and blocks of public blockchain(s) linked to at least one private blockchain owned by said each user;

at least one digital repository, wherein the digital information, or a part of the digital information, of the at least one transaction is stored;

at least one trust function blockchain associated to said each user, being a public blockchain that records a set of parameters that define trust of said each user, on the basis of an algorithm whose rules are defined in the at least one smart contract;

wherein the at least one smart contract comprises rules determining that upon execution of the at least one smart contract new blocks are added to at least one footprint blockchain and to at least one trust function blockchain of said each user involved in the at least one transaction;

wherein the new blocks added upon execution of the at least one smart contract comprise a hyperlink towards the at least one digital repository where digital information of the transaction is stored.

2. The computer-implemented system of claim 1, wherein the parameters that define a user's trust are used as a proof-of-stake indicator in a blockchain protocol.

3. The computer-implemented system of claim 1, wherein the fingerprint associated to each user, comprises at least one physical unclonable function or a secure element.

4. The computer-implemented system of claim 1, wherein the plurality of private blockchains comprise a plurality of sidechains.

5. A computer-implemented method for secure transactions between said users of a network, carried out by the computer-implemented system of claim 1, comprising:

a) submitting a transaction between at least two users of the network, said transaction comprising at least one smart contract, said smart contract comprising rules;
b) authorizing the transaction;
c) executing the at least one smart contract;

and wherein the method comprises:

d) adding at least one new block to at least one blockchain of the computer-implemented system, on the basis of the rules defined in the smart contract; and wherein said executing the at least one smart contract includes executing a consensus mechanism for addition of the at least one new block that is automatically granted on execution of the smart contract, wherein the adding a new block to at least one blockchain consists of:

adding a new block to at least one private blockchain and to at least one trust function blockchain of each of said two or more users;

and wherein:

said b) authorizing the transaction comprises:

b1) authenticating the identity of the users involved in the transaction;
b2) verifying trust of the users involved in the transaction, by means of the trust function blockchain;
b3) authorizing the transaction in response to all users accepting and satisfying all the rules of the smart contract.

6. The computer-implemented system of claim 1, wherein the smart-contract comprises a plurality of independent rules-blocks, organized according to users' negotiation.

7. The computer-implemented system of claim 6, wherein said rules-blocks comprise links to a plurality of blockchains, or to a plurality of digital repositories, or to both a plurality of blockchains and a plurality of digital repositories, and wherein said rules-blocks are users of the network having a digital identity consisting in the pattern of said links.

8. The computer-implemented method of claim 5, wherein the rules comprise rules-blocks wherein acceptance of the rules-blocks by the users improves a level of trust of the rules-blocks of a given user.

9. The computer-implemented method of claim 8, wherein the consensus mechanism is deployed through the rules-blocks.

10. The computer-implemented system of claim 1, wherein at least one of the users is an object.

11. The computer-implemented system of claim 4, wherein at least two of the sidechains are semantically linked.

12. The computer-implemented method of claim 5, wherein said authenticating the identity of the users involved in the transaction is by fingerprint, by footprint, or by both fingerprint and footprint.

13. The computer-implemented system of claim 1, wherein the blocks in the computer-implemented system are linked by a first hash function to blocks of a first blockchain and by a second hash function to blocks of a second blockchain.

14. The computer-implemented system of claim 1, wherein the new blocks are also semantically linked.

* * * * *